United States Patent

[11] 3,548,780

| [72] | Inventor | George G. Kliewer |
| | | 233 N. Villa, Fresno, Calif. 93727 |
| [21] | Appl. No. | 801,362 |
| [22] | Filed | Feb. 24, 1969 |
| [45] | Patented | Dec. 22, 1970 |

[54] TEMPERATURE SIGNALING DEVICE
7 Claims, 5 Drawing Figs.

[52] U.S. Cl. ................................................ 116/114.5, 73/358
[51] Int. Cl. .................................................... G01k 11/06
[50] Field of Search ........................................ 116/114.5, 103, 101; 73/358; 99/419

[56] References Cited
UNITED STATES PATENTS

| 945,978 | 1/1910 | Nielsen et al. | 116/114.5 |
| 2,363,711 | 11/1944 | Walsh | 116/114.5 |
| 2,694,997 | 11/1954 | Alger, Jr. | 116/114.5UX |
| 3,090,235 | 5/1963 | Houser | 73/358 |
| 3,280,629 | 10/1966 | Kliewer | 116/114.5X |

FOREIGN PATENTS

| 24,595 | 9/1922 | France | 116/114.5 |

Primary Examiner—Louis R. Prince
Assistant Examiner—Daniel M. Yasich
Attorney—Naylor and Neal ABSTRACT: A food temperature indicator having a spring loaded indicating rod member releasable from a retracted position responsive to the disengagement thereof by a retaining member. The retaining member cooperatively engages structure on the indicator rod for maintaining the indicator rod in position within a tubular housing prior to release. To effect disengagement, the retaining member must displace a volume of fusible material. A sealing barrier is provided to seal the interior of the indicator prior to the release of the indicating member.

PATENTED DEC 22 1970　　3,548,780
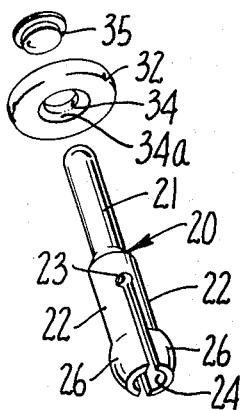
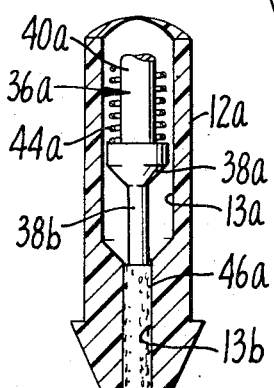
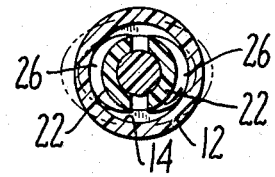
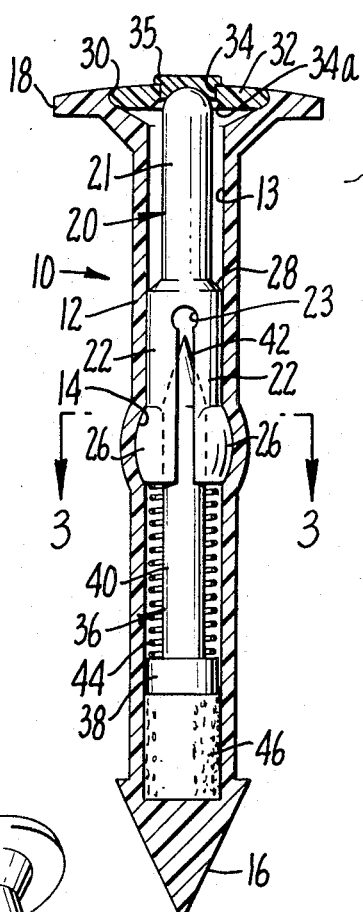
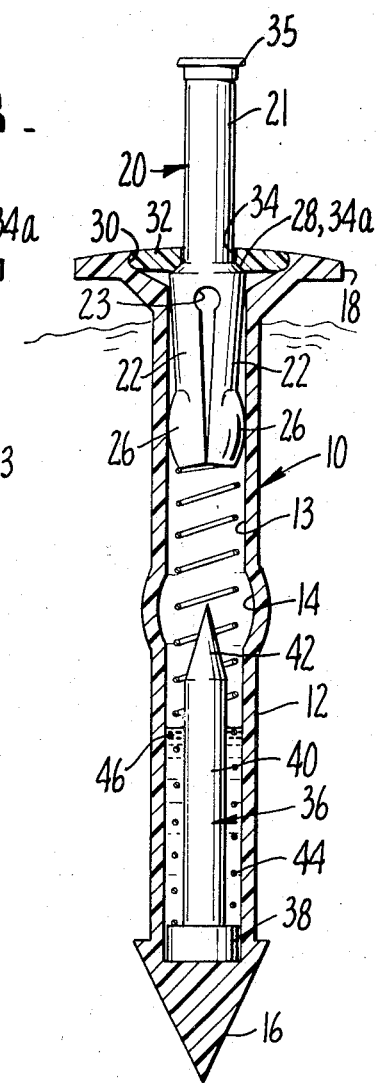
INVENTOR.
GEORGE G. KLIEWER
BY Naylor & Neal
ATTORNEYS

3,548,780

TEMPERATURE SIGNALING DEVICE

BACKGROUND OF THE INVENTION

The present invention relates to a temperature signaling device adapted for insertion into an article of food to indicate the attainment of a predetermined internal temperature. It is especially concerned with an improved device of the type disclosed in my U.S. Pat. No. 3,280,629.

Signaling devices responsive to the melting, plastic flow, and/or yielding of a fusible substance are well-known in the prior art. One such device is shown in my aforementioned patent and others are disclosed in my U.S. Pat. No. 3,140,611. Still further examples may be found in the art of record in these patents. In recent years, such devices have been well accepted by the food industry, and particularly the poultry industry, for retail distribution with their commodities. The customary practice has been to place the indicator in the commodity prior to its packaging and distribution. Thus, the purchaser of the commodity is provided with a properly placed and calibrated indicator and need not be concerned with making such provisions himself.

SUMMARY OF THE INVENTION

In its broadest aspects, the present invention is concerned with an improved temperature responsive release mechanism for incorporation into a temperature indicator of the type employing an extensible indicating staff which is released upon the attainment of a predetermined temperature. The mechanism comprises a locking structure carried by the staff, a retaining member slidably engaged with the locking structure to maintain it in a locked condition retaining the staff against extension, and a volume of fusible material disposed in supporting relationship to the retaining member. The retaining member is disposed so as to normally be supported in engagement with the locking structure and, upon fusion of the fusible material, to be displaced therethrough to a position disengaged from the structure. Thus, fusion of the fusible material functions to trigger the indicating staff for extension.

The invention is also concerned with a barrier to seal the indicating staff of such an indicator prior to its extension. The barrier prevents both the escape from and intrusion of material into the housing.

The principal advantage of the mechanism is that it is not dependent upon the employement of a fusible material having special shear or tension sustaining characteristics, or any particular premolded form. The only requirement of the fusible material is that it be capable of displacement upon fusion. Thus, nearly any variety of fusible material may be used. This and other advantages of the invention will become more apparent when viewed in light of the accompanying drawings and the following detailed description.

BRIEF DESCRIPTION OF THE DRAWING

FIG. 1 is an exploded perspective view of a first embodiment of the signaling device;

FIG. 2 is an axial sectional view of the device with the indicating staff in the retracted position;

FIG. 3 is a transverse sectional view of the device, taken on the plane designated by lines 3-3 of FIG. 2, illustrating the configuration of the interlocking members;

FIG. 4 is an axial sectional view of the device with the indicating staff in the extended position; and, FIG. 5 is an axial sectional view of an alternative embodiment of the signaling device, with parts thereof broken away for the sake of simplicity.

DESCRIPTION OF THE ILLUSTRATED EMBODIMENTS

Referring now in detail to the drawing, the signaling device or indicator is designated in its entirety by the numeral 10. It comprises, as its basic element, a tubular housing 12 defining an axial passage 13 closed at one end and open at the other. Between its extremes, a toroidal distention 14 is formed. This distention, as can be seen from FIGS. 2 and 4, provides an enlarged recess within the passage 13 having curvilinear surfaces of generally smooth hemispherical configuration. The closed end of the housing, designated 16, is exteriorly pointed and barbed to facilitate insertion into and retention by an article of food. An annular flange 18 is formed integrally with and extends around the open end of the housing to limit its penetration into an article of food.

In the preferred embodiment, the housing is formed of nylon. This material is ideally suited for use in fabricating the housing because it may be injection molded and possesses strength and heat resistant characteristics more than ample to satisfy the conditions under which the device is normally used. Its resiliency also greatly facilitates assembly of the device, as will become more apparent from the subsequent discussion.

As indicator staff 20 is axially received within the passage 13 for slidable movement between the retracted and extended positions, as illustrated in FIGS. 2 and 4, respectively. The retracted position indicates a condition below a predetermined temperature, while the extended position indicates a condition above the predetermined temperature. The outer portion of the staff 20, designated 21, is of a uniform reduced diameter and designed for extension from the housing upon movement of the staff to the extended position. It is this portion which performs the signaling function of the device. The inner portion of the staff 20 is of enlarged cross section as compared to the outer portion and bifurcated to the outer portion and bifurcated at its distal end to provide a pair of oppositely disposed bifurcations 22 defining a generally cylindrical cavity 24 therebetween. A circular section 23 is formed between the bifurcations 22 to facilitate their movement towards and away from each other, as will become more apparent subsequently. Each bifurcation 22 is formed with an enlarged bulbous exterior surface 26 of generally hemispherical configuration proportioned for complemental engagement with the distention 14 when the staff is in the retracted position, as seen in FIG. 2. The upper end of the enlarged inner portion is of cylindrical cross section and proportioned to slidably engage the wall of the passage 13 to guide the staff for axial movement therein. It terminates in a tapered shoulder 28.

The open end of the housing 12 is enlarged to define a circular recess 30 which securely receives an annular cap 32. The exterior and interior surfaces of the cap and recess, respectively, are of complemental generally hemispherical configuration to effect retention of the cap. In assembly, the surfaces deflect to permit the cap to be snapped in place. The cap, similarly to the housing, is preferably fabricated of nylon. The interior of the cap defines an aperture 34 of a diameter less than that of the shoulder 28 proportioned to slidably receive the outer portion 21. Through the proportioning of this aperture, the under surface of the cap provides an abutment for the shoulder 28 which limits extension of the staff, as may be seen from FIG. 4. The under surface is tapered around the aperture 34 to complementally mate with the tapered shoulder 28. Thus, in addition to limiting extension of the staff, the abutment of the shoulder and cap also functions to seal the interior of the housing.

A barrier 35 is sealingly disposed within the aperture of the cap 32 and over the distal end of the staff 20 when the staff is in the retracted position, as seen in FIG. 2. This barrier functions to completely seal the interior of the housing 12 so long as the staff is in the retracted position. It is designed, however, to release with the staff, as seen in FIG. 4, so as not to impede extension of the staff. The barrier may take the form of a preformed caplike element which snaps into place, or an element which is molded in place after assembly of the signalling device. A number of suitable materials may be used for its fabrication. For example, if the barrier takes the form of a preformed caplike element, nylon may be employed. Where the barrier is molded in place, a very high melting point wax would be suitable. It is essential, however, that the material be capable of acting as a seal at normal operating temperatures of the device while, at the same time, permitting the unrestricted extension of the staff.

The primary purpose of the barrier 35 is to assure that no material may escape from the interior of the signaling device prior to extension of the indicator staff 20. It also, naturally, functions to seal the device from the intrusion of foreign material prior to extension of the staff. Once the staff is extended, the complemental tapered surfaces on the shoulder 28 and cap 32 function to seal the interior of the housing.

A retaining rod 36 is received within the housing to the inner end of the staff 20. This rod, as may be seen from FIG. 2, normally functions to maintain the staff in the retracted position. It comprises a piston 38 loosely received within the passage 13 and a probe 40 fixed to and extending from the piston toward the bifurcated end of the staff. The piston is proportioned to permit relatively unrestricted fluid flow therearound. The probe is of cylindrical cross section and proportioned to be snugly received within the cavity 24 defined between the bifurcations 22 so as to maintain the bifurcations in an extended position with the surfaces 26 thereof in interlocking engagement with the distention 14. The latter condition functions to lock the staff in the retracted position, as seen in FIG. 2. The probe terminates in a tapered point 42 and is of such a length that, when the piston 38 is seated against the bottom of the passage 13, the cylindrical section thereof is removed from the confines of the distention 14. The latter condition functions to release the bifurcations 22 for contraction, as may be seen in FIG. 4.

A compression coil spring 44 is concentrically received around the probe of the retaining rod in interposed relationship between the distal ends of the bifurcations 22 and the surface of the piston 38 in opposition thereto. This spring is disposed in the compressed state to normally urge the retaining rod and indicator staff apart. In operation, as will become more apparent from the subsequent discussion, upon the attainment of a predetermined temperature, it first functions to displace the retaining rod 36 to the bottom of the passage 13 and then to extend the indicating staff 20. This operation may be seen from a comparison of FIGS. 2 and 4.

The lower end of the passage 13 contains a volume of fusible material 46 disposed to support the piston 38 in spaced relationship to the bottom of the passage. The volume of the material is sufficient to maintain the rod 36 in a position wherein the cylindrical portion of the probe 40 is snugly received in the cavity 24, as seen in FIG. 2. Thus, through the retaining rod 36, the material acts to prevent contraction of the bifurcations 22. This, in turn, maintains the surfaces 26 in complemental engagement with the interior surface of the distention 14 to lock the staff 20 against extension.

The material 46 may be of any number of different compositions, so long as it is of sufficient compressive strength to support the piston 38 when in a solid state and capable of displacement by the piston upon its fusion to a molten state. Because it need only support compressive force, it may also be of substantially any physical form. For example, it may be of a powdered or granular form, or in the form of a solid slug. While the exploded illustration of FIG. 1 illustrates the material in what appears to be a solid cylindrical configuration, it should be understood that this merely intended to show the form the material assumes when confined within the passage 13. The material need not be capable of self-sustaining such a configuration.

The temperature at which the indicator staff 20 is released is determined by the temperature at which the material 46 fuses to a molten state. Thus, through selection of the material the release temperature may be selectively varied. Alloys of the type suggested in my aforementioned patent are suitable for the normal range of cooking temperatures. Because of the unique construction of the device, it is also possible to employ any number of the fusible organic compounds in powdered or granular form. For example, the organic compound known as "TEMPIL 181," manufactured by The Tempil Corporation of N.Y. N.Y. might be employed.

In addition to controlling the temperature of release through the selection of the material 46, it is also possible to selectively vary this temperature through selective variance of the relative proportions of the piston 38 and passage 13. This results because passage of the piston 38 through the molten material is, of necessity, dependent upon the viscosity of the material. Thus, by changing the relative proportions of the piston 38 and passage 13, the viscosity characteristics of the molten material required to permit displacement of the material by the piston may be varied.

FIG. 5 illustrates a modified embodiment of the signaling device 10. This embodiment differs from that of FIGS. 1 to 4 only in the configurations of the lower end of the piston 38 and the bottom of the passage 13. The differences are intended primarily to minimize the amount of fusible material required in the device. They do not materially affect its operation.

For the sake of simplicity, the elements of the FIG. 5 embodiment are designated by numerals corresponding to those of the FIGS. 1 to 4 embodiment, followed by the subscript "a." Accordingly, the elements in FIG. 5 are designated as follows: housing 12a; retaining rod 36a; piston 38a; probe 40a; spring 44a; and, fusible material 46a. The passage of the housing 12a is designated 13a and differs from the passage 13 in that it terminates in a section 13b of reduced diameter. This section receives the material 46a. The piston 38a differs from the piston 38 in that it terminates in a section 38b of reduced diameter disposed for support on the volume of material 46a received in the section 13b. The relative proportions of the sections 13b and 38b are such that the section 38b may readily displace the material 46a when it is heated to a molten state. This displacement, similarly to that of the FIGS. 1 to 4 embodiment, functions to permit the retaining rod 36a to move to a position releasing the indicator staff (not illustrated) associated therewith. Ideally, the depth of the section 13b is greater than the length of the section 38b. Thus, the section 38b may extend completely into the section 13b upon displacement of the material 46a.

The method of assembling the signalling device may best be seen from FIGS. 1 and 2. Assembly is commenced by first inserting a quantity of the fusible material 46 into the housing 12 while maintaining it in an upright condition. This insertion may be effected with the material in a solid, granular or powdered state, or even a molten fused state. If in the latter state, the material must be cooled to solidification prior to continued assembly. Once the material is so placed, the retaining rod 36 and spring 44 are dropped into place. The indicator staff 20 is then inserted over the retaining rod and the cap 32 is snapped into place. Once assembled to this point, the device is in a self-contained condition, with the outer portion 21 of the indicator staff 20 fully extended through the aperture 34 by the spring 44. The indicator staff is then fully compressed to the position illustrated in FIG. 2. During the latter operation, the bulbous exterior surfaces 26 on the bifurcations 22 resiliently deflect the housing 12 to a generally oval configuration as the cavity 24 is forced over the probe 40. This resilient deflection is diagrammatically illustrated by the phantom line representation of the housing illustrated in FIG. 3. From this FIG., it can also be seen that the bulbous exterior surfaces 26 have a width less than the internal diameter of the passage 13. This configuration facilitates the assembly by permitting the temporary distortion of the housing wall to the generally oval condition as the cavity 24 is forced over the probe 40. Once the bulbous exterior surfaces 26 fully enter the confines of the distention 14, as illustrated in FIG. 2, the housing resiliently returns to its original cross section. Assembly is completed by sealingly disposing the barrier 35 over the distal end of the staff.

The operation of the device may best be seen from a comparison of FIGS. 2 and 4. In this operation, upon heating of the device to the point where the material 46 fuses to a molten state, the rod 36 is first displaced through the material and to the bottom of the passage 13 under the influence of the spring 44. Upon movement to this disposition, the probe of the rod functions to release the bifurcations 22 for contraction towards each other. This, in turn, permits the spring to fully extend the indicator staff. Upon the latter occurrence, the operation is complete.

In the overall operation, the spring performs the function of contracting the bifurcations 22, as well as depressing the retaining rod and extending the indicator staff 20. The contraction results from the camming action of the hemispherical interior surfaces of the distention 14 on the bulbous hemispherical exterior surfaces 26 responsive to the axial force applied to the indicator staff by the spring.

It should be understood that the assembly technique said operation of the FIG. 5 embodiment correspond identically to the FIGS. 1—4 embodiment. The primary difference in the embodiments is that that of FIG. 5 requires less fusible material.

While preferred embodiments of the invention have been illustrated and described it should be understood that alternative embodiments are also anticipated. For example, the housing might incorporate a purging chamber into which the molten material 46 could be forced, thereby permitting substantially identical movement of the retaining rod to effect release of the indicator staff. With such an arrangement, the fusible material would be displace ahead of the piston, rather than around it.

I claim:

1. In a temperature responsive signaling device of the type comprising:
   I. a tubular housing closed at one end and open at the other end;
   II. an indicator staff received in the housing for slidable movement between retracted and extended positions relative thereto; and an improved construction for maintaining the staff in the retracted position until a predetermined temperature is attained and extending the staff to the extended position upon attainment of said temperature, said construction comprising:
      a. latching means comprising:
         1. mutually engaged interlocking elements on the housing and indicator staff, respectively, to maintain the indicator staff in the retracted position, said elements being mutually disengageable to permit the indicator staff to move to the extended position; and
         2. a retaining rod received within the housing, said rod contacting at least one of the interlocking elements to maintain the elements in the mutually engaged condition and being movable away from the staff to a position permitting the release of the interlocking elements from mutual engagement;
      b. biasing means engaging the indicator staff and retaining rod to urge movement thereof away from each other and urge disengagement of the interlocking elements and movement of the indicator staff toward the extended position; and
      c. a volume of fusible material disposed within the housing in engagement with the retaining rod to maintain the rod in contact with at least one of the interlocking elements and, thus maintain the staff in the retracted position, said volume, upon being heated to the temperature at which it becomes molten, being displaceable by the retaining rod under the influence of said biasing means to permit the rod to move to the position permitting release of the interlocking elements from mutual engagement.

2. In a temperature responsive signaling device of the type comprising:
   I. a tubular housing closed at one end and open at the other end;
   II. an indicator staff received in the housing for slidable movement between retracted and extended positions relative thereto; and an improved construction for maintaining the staff in the retracted position until a predetermined temperature is attained and extending the staff to the extended position upon attainment of said temperature, said construction comprising:
      a. a laterally expansible inner end on the staff expanded into locked engagement with the interior of the housing to maintain the staff in the retracted position, said end being contractible out of locked engagement with the housing to permit the staff to move to the extended position;
      b. a retention rod received within the housing in engagement with the staff to maintain the inner end thereof in expanded condition locked in engagement with the housing, said rod being movable relative to the staff to a position permitting the inner end of the staff to contract out of locked engagement with the housing;
      c. resilient means urging the indicator staff towards the extended position and the retention rod to the position permitting the inner end of the staff to contract out of locked engagement with the housing; and,
      d. a volume of fusible material disposed within the housing in engagement with the rod to maintain the rod in a position maintaining the inner end of the rod in expanded condition, said volume, upon being heated to the temperature at which it becomes molten, being displaceable by the rod under the influence of the biasing means to permit the rod to move the position permitting the inner end of the staff to contract out of locked engagement with the housing.

3. In a temperature responsive signaling device of the type comprising:
   I. a tubular housing defining an axially extensive bore closed at one end and open at the other end;
   II. an indicator staff received within the bore for slidable movement between retracted and extended positions relative to the housing; and an improved construction for maintaining the staff in the retracted position until a predetermined temperature is reached and extending the staff to the extended position upon attainment of said temperature, said construction comprising:
      a. a first retention surface on the interior of the bore and extending at least partially therearound;
      b. a bifurcated generally axially extending portion formed on and opening through the inner end of staff to define at least one pair of oppositely disposed bifurcations, each of which has a second retention surface on the exterior thereof in locked engagement with the first surface, said second surfaces being disposed for cammed compression by the first surface responsive to movement of the staff towards the extended position to contract the bifurcations toward each other and release the second surfaces from locked engagement with the first surface;
      c. a rod received within the bore to the inner end of the staff for movement between a first position received between the bifurcations of the staff to prevent the contraction thereof and a second position removed from the bifurcations;
      d. expansible compression means interposed between the rod and staff to urge movement thereof apart and extension of the staff; and,
      e. a volume of fusible material interposed between the rod and the closed end of the bore to maintain the rod in the first position, said volume, upon being heated to the temperature at which it becomes molten, being displaceable by the rod to permit movement of the rod to the second position under the influence of the compression means.

4. In a signaling device according to claim 3, the improved construction wherein the rod comprises:
   a. a piston disposed in opposition to the closed end of the bore, said piston having a cross-sectional area appreciably less than the cross-sectional area of the bore to permit molten fusible material displaced by the rod to pass readily thereby; and, b. a probe fixed to and extending from the piston towards the inner end of the staff, said probe terminating in a distal end proportioned for slidable receipt between the bifurcations of the staff to, upon such receipt, prevent the contraction of the bifurcations.

5. In a signaling device according to claim 4, the improved construction wherein the expansible means comprises a compression coil spring concentrically received around the probe interposed abutting relationship between the inner end of the staff and the piston.

6. In a temperature responsive signaling device of the type comprising:
I. a tubular housing defining an axially extensive bore closed at one end and open at the other end;
II. an indicator staff received in the housing for slidable movement between retracted and extended positions relative thereto; and an improved construction for maintaining the staff in the retracted position until a predetermined temperature is attained and extending the staff to the extended position upon attainment of said temperature, said construction comprising:
  a. an enlarged recess formed in the interior of said tubular housing and comprising a portion of said axially extensive bore;
  b. a laterally expansible bulbous inner end on the staff expanded into locked engagement with the interior of the housing within said enlarged recess to maintain the staff in the retracted position, said bulbous end defining a chamber and being contractible out of locked engagement with the housing to permit the staff to move to the extended position;
  c. a retention rod received within the housing and having one end thereof snugly received within the staff chamber to maintain the bulbous inner end thereof in expanded condition locked in engagement with the housing within said enlarged recess, said rod further including a piston at the other end thereof and being movable relative to the staff to a position permitting the inner end of the staff to contract out of locked engagement with the housing;
  d. resilient means engaging the inner end of said indicator staff and said retention rod piston, said resilient means urging the indicator staff toward the extended position and the retention rod to the position permitting the bulbous inner end of the staff to contract out of locked engagement with the housing; and,
  e. a volume of fusible material disposed within the housing in engagement with the rod to maintain the rod in a position maintaining the inner end of the rod in expanded condition, said volume upon being heated to the temperature at which it becomes molten, being displaceable by the rod under the influence of the biasing means to permit the rod to move to the position permitting the inner ends of the staff to contract out of locked engagement with the housing.

7. In a temperature responsive signaling device of the type comprising:
I. a tubular housing defining an axially extensive bore closed at one end and open at the other end;
II. an indicator staff received with the bore for slidable movement relative to the housing between a retracted position wherein said staff is entirely within the housing and an extended position wherein said staff projects from the end of said housing;
III. biasing means disposed to normally urge the staff to its extended position relative to the housing; and,
IV. latching means disposed to lock the staff in its retracted position relative to the housing and against the action of the biasing means until a predetermined temperature is reached and, upon attainment of said temperature, function to release the staff for movement to the extended position under the influence of the biasing means; the improvement comprising a sealing cap closing the open end of said housing and having an opening therein through which said indicator staff projects when in its extended position, abutment means on said indicator staff cooperating with said cap to limit outward movement of said staff, and an impermeable barrier closing the opening of said cap when said staff is in its retracted position and extending over the distal end of said staff and sealing off the open end of said bore whereby intrusion of foreign material between the open end of the housing and the distal end of the staff is completely prevented.

UNITED STATES PATENT OFFICE
CERTIFICATE OF CORRECTION

Patent No. 3,548,780                     Dated December 22, 1970

Inventor(s)    George G. Kliewer

It is certified that error appears in the above-identified patent and that said Letters Patent are hereby corrected as shown below:

Column 5, lines 32 and 71, Column 6, line 32, and Column 7, line 14, "end;", each occurrence, should read -- end; and, --. Column 5, lines 35 and 74, Column 6, line 3 and Column 7, line 17, cancel "and", each occurrence.

Signed and sealed this 4th day of May 1971.

(SEAL)
Attest:

EDWARD M. FLETCHER, JR.              WILLIAM E. SCHUYLER, JR.
Attesting Officer                    Commissioner of Patents FORM PO-1050 (10-69)                                              USCOMM-DC 60376